(12) United States Patent
Lee et al.

(10) Patent No.: US 9,442,226 B2
(45) Date of Patent: Sep. 13, 2016

(54) REFLECTION PLATE FOR BACKLIGHT UNIT AND BACKLIGHT UNIT OF LIQUID CRYSTAL DISPLAY HAVING GOOD THERMAL CONDUCTIVITY

(71) Applicant: LG CHEM, LTD., Seoul (KR)

(72) Inventors: Heon Sang Lee, Daejeon (KR); Eung Soo Kim, Daejeon (KR); Myung Se Lee, Daejeon (KR); Bong Keun Lee, Daejeon (KR); Min Han Kwak, Daejeon (KR); Seon Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/673,196

(22) Filed: Mar. 30, 2015

(65) Prior Publication Data

US 2015/0205164 A1 Jul. 23, 2015

Related U.S. Application Data

(62) Division of application No. 11/511,628, filed on Aug. 29, 2006.

(30) Foreign Application Priority Data

Aug. 31, 2005 (KR) .................. 10-2005-0080738
Aug. 31, 2005 (KR) .................. 10-2005-0080739

(51) Int. Cl.
| | |
|---|---|
| C09K 19/00 | (2006.01) |
| G02B 5/08 | (2006.01) |
| F21V 8/00 | (2006.01) |
| G02B 1/04 | (2006.01) |
| G02F 1/1335 | (2006.01) |

(52) U.S. Cl.
CPC . *G02B 5/08* (2013.01); *G02B 1/04* (2013.01); *G02B 6/0031* (2013.01); *G02B 6/0085* (2013.01); *G02F 1/133605* (2013.01); *G02F 2001/133628* (2013.01); *Y10T 428/10* (2015.01)

(58) Field of Classification Search
CPC ................ G02F 1/133605; G02F 1/133628; G02F 1/04; G02F 1/08; G02F 5/08; G02F 5/0816; G02F 5/0841; G06B 6/0085; G06B 6/0031; H01L 33/405; Y10T 428/10
USPC .......... 428/1.1, 212; 349/117, 120, 67, 161; 362/255, 256, 314, 560, 561, 580, 615, 362/623, 97.2; 524/87, 94, 141, 143, 497
See application file for complete search history.

(56) References Cited

U.S. PATENT DOCUMENTS

| | | | |
|---|---|---|---|
| 5,837,757 A | 11/1998 | Nodera et al. | |
| 6,246,459 B1 | 6/2001 | Simhambhatla et al. | |
| 2002/0113534 A1 | 8/2002 | Hayashi et al. | |
| 2002/0159172 A1 | 10/2002 | Kozhukh | |
| 2002/0196628 A1 | 12/2002 | Yoshida et al. | |
| 2003/0143412 A1 | 7/2003 | Yamaguchi et al. | |
| 2003/0170883 A1 | 9/2003 | Martin et al. | |
| 2004/0032725 A1 | 2/2004 | Hsieh et al. | |
| 2004/0252502 A1 | 12/2004 | McCullough et al. | |
| 2005/0135118 A1 | 6/2005 | Takata | |
| 2006/0268542 A1* | 11/2006 | Chen et al. | 362/225 |

FOREIGN PATENT DOCUMENTS

| | | |
|---|---|---|
| CN | 1256300 A | 6/2000 |
| JP | 02-272485 A | 7/1990 |
| JP | 04-138651 A | 5/1992 |
| JP | 04-239540 | 8/1992 |
| JP | 07-070422 A | 3/1995 |
| JP | 07-242781 | 9/1995 |
| JP | 09-176471 | 7/1997 |
| JP | 11-181267 | 7/1999 |
| JP | 2001-305321 | 10/2001 |
| JP | 2002-040214 | 2/2002 |
| JP | 2002-050222 | 2/2002 |
| JP | 2002-098811 | 4/2002 |
| JP | 2002-138150 | 5/2002 |
| JP | 2003-121616 | 4/2003 |
| JP | 2003-145657 | 5/2003 |
| KR | 10-2004-0017718 | 2/2004 |
| WO | 2004036114 A1 | 4/2004 |
| WO | 2005/056681 A1 | 6/2005 |

OTHER PUBLICATIONS

"Thermal Conductivity of Boron Nitride Composite"; Polymer Composite, vol. 26, (1), P66-73, Feb. 2005.
Chinese Office Action mailed Mar. 1, 2012 for Publication No. 201110062946.7; with English Translation.
Japanese Office Action mailed Jun. 14, 2011 for Publication No. 2007-533410; with English Translation.
Notification of Taiwan Office Action for application No. 095131663 dated Sep. 30, 2009.

* cited by examiner

*Primary Examiner* — Ruiyun Zhang
(74) *Attorney, Agent, or Firm* — Dentons US LLP

(57) ABSTRACT

The present invention relates to a reflection plate for a backlight unit in a liquid crystal display device, and more particularly, to a reflection plate for a backlight unit in a liquid crystal display device, which is made of a thermoplastic thermal conductive resin composition having a thermal conductivity of at least 0.35 W/mK, thereby effectively solving the thermal problem of the backlight unit, and having excellent properties such as shock resistance, heat resistance, mechanical strength, and the like, as well as having excellent reflectivity, thereby improving the durability of the liquid crystal display device.
Furthermore, the present invention relates to a backlight unit of a liquid crystal display device, comprising a reflection plate positioned at a lower portion of a lamp of the backlight unit for reflecting the light coming out of the lamp, a supporting rod for the lamp, and a lower plate functioning as a heat sink, wherein the reflection plate and the lower plate are made of the same material, thereby effectively solving the thermal problem of the backlight unit, and simplifying the manufacturing process.

3 Claims, No Drawings

REFLECTION PLATE FOR BACKLIGHT UNIT AND BACKLIGHT UNIT OF LIQUID CRYSTAL DISPLAY HAVING GOOD THERMAL CONDUCTIVITY

This application is a divisional application of U.S. patent application Ser. No. 11/511,628, filed Aug. 29, 2006, which claims the benefit of Korean Patent Application No. 10-2005-0080738, filed on Aug. 31, 2005, and Korean Patent Application No. 10-2005-0080739, filed on Aug. 31, 2005 which are hereby incorporated by reference for all purposes as if fully set forth herein.

TECHNICAL FIELD

The present invention relates to a reflection plate for a backlight unit and a backlight unit in a liquid crystal display device, and more particularly, to a reflection plate for a backlight unit in a liquid crystal display device for effectively solving the thermal problem of the backlight unit, and having excellent properties such as shock resistance, heat resistance, mechanical strength, and the like, as well as having excellent reflectivity, thereby improving the durability of the liquid crystal display device, and to a backlight unit of a liquid crystal display device, of which all the parts are made of the same material, thereby effectively solving the thermal problem of the backlight unit, and simplifying the manufacturing process.

BACKGROUND ART

Unlike a cathode-ray tube, generally, a liquid crystal display (LCD) device does not have a light emitting function in itself, and thus it is required that a light emitting device is maintained at a uniform brightness over an entire screen.

According to the methods of providing the light source, LCDs can be classified into a transmissive type, in which a separate light and a backlight unit are used, and a reflective type in which an external light is used as the light source. Of these methods, in the case of reflective type LCDs, many studies have been carried out because the backlight unit is not required and their power consumption is low. However, many applications have not been made until now since their visibility is low when the brightness is not sufficient from the external light source. On the other hand, in the case of transmissive type LCDs, which have been actively used in recent years, the key factor is to supply the light source with a uniform brightness through a backlight unit.

A backlight unit can be classified into a top-down method system, in which a light source is placed at the bottom surface of a liquid crystal panel to illuminate the entire surface of the substrate, and an edge illumination system, in which a light source is placed at both side surfaces of the unit and light is evenly diffused through a light guide plate and a reflection plate.

Such an edge illumination system backlight unit is mainly used for a small-sized LCD monitor or notebook computer since the brightness is uniform and the power consumption is low, but a light guide plate is definitely required for evenly diffusing the light from the side surfaces.

In the case of the top-down method system backlight unit on the other hand, the light use rate is high because a light source directly illuminates a substrate, and it is applicable to a large-sized LCD TV or monitor because the size is not limited. However, it causes a problem of increased heat, as a light source is very closely positioned with a liquid crystal panel and a large number of lamps are required to supply the light source. In the case where the heat produced is too high, it can be the main reason for inducing a smudge on the screen, thereby shortening the life of a liquid crystal panel. In recent years, particularly as LCDs have become larger and thinner, the thermal problems of the backlight unit have emerged as a problem to be solved by all means.

The structure of a typical top-down method system backlight unit is illustrated below.

In the top-down method system back light unit, a supporting rod for holding a liquid crystal panel is positioned around a lamp, that is, a light source, and also a diffuse sheet, a prism sheet, and a dual brightness enhancement film (DBEF) sheet are sequentially arranged at an upper portion of the lamp. Furthermore, a reflection plate for preventing the light from leaking, an external supporting rod, and a lower plate functioning as a heat sink are arranged at a lower portion of the lamp.

As a reflection plate material for the components of such a backlight unit, a white polyester film is disclosed in Japanese Laid-Open No. H04-239540; however, there is a problem in that the tint is lowered and the luminance is reduced due to yellowing of a reflection plate caused by the heat generated from a light source.

A technology for adding various additives and a structural change to improve the reflectivity, transmittance ratio, or the like, of a white polyester film is disclosed in Japanese Laid-Open Nos. 2002-98811, 2002-138150, and 2001-305321, and a technology for using a white porosity polyester film to enhance the reflectivity of a reflective film is disclosed in Japanese Laid-Open Nos. 2002-50222 and 2002-40214. Moreover, a technology for manufacturing a reflection plate using an ultra-fine foam polyester sheet is disclosed in Japanese Laid-Open Nos. 2003-145657 and 2003-121616.

A technology for the reflectivity and shock resistance of a white polycarbonate resin is disclosed in U.S. Pat. No. 5,837,757, Japanese Laid-Open Nos. H07-242781 and H09-176471, and a technology for manufacturing a reflective sheet using a flame-retardant white polycarbonate resin is disclosed in Japanese Laid-Open No. 1999-181267.

However, in the technology for manufacturing a reflection plate as described above, a method is disclosed for improving the reflectivity, heat resistance, shock resistance, or the like, of a reflection plate material, but a solution to the thermal problem of a backlight unit is not presented. In particular, any attempt at solving the thermal problem by applying a thermal conductive resin composition to a reflection plate material has not been made.

A method for applying a high thermal conductive metallic material such as aluminum to a lower plate of the backlight unit is disclosed to solve the thermal problem of the backlight unit in Korean Laid-Open No. 2004-0017718, but there is a problem in that a solution to the thermal problem is obstructed since a reflection plate is positioned between a heating element and a lower plate, and the cost of a product increases.

In order to solve the problems occurring in the prior art as described above, it is an object of the present invention to provide a reflection plate for a backlight unit in a liquid crystal display device for effectively solving the thermal problem of the backlight unit, and having excellent properties such as shock resistance, heat resistance, mechanical strength and the like, as well as having excellent reflectivity, thereby improving the durability of the liquid crystal display device.

Moreover, it is another object of the present invention to provide a backlight unit of a liquid crystal display device for effectively solving the thermal problem of the backlight unit, and simplifying the manufacturing process.

DISCLOSURE

Technical Problem

In order to accomplish the above objects of the present invention, there is provided a reflection plate for a backlight unit of a liquid crystal display device, characterized in that it is made of a thermoplastic thermal conductive resin composition having a thermal conductivity of at least 0.35 W/mK.

Furthermore, according to the present invention, there is provided a backlight unit of a liquid crystal display device, characterized in that it includes a reflection plate positioned at a lower portion of a lamp of the backlight unit for reflecting a light coming out of the lamp, a supporting rod for the lamp, and a lower plate functioning as a heat sink, wherein the reflection plate and the lower plate are made of the same material.

Hereinafter, the present invention will be described in detail.

As a reflection plate of a backlight unit is located very close to a light source lamp, it is effective at solving the thermal problem when the thermal conductivity of a reflection plate material is high. The thermal conductivity of plastic is typically low, usually up to 0.2 W/mK, and therefore, even though it is used as a material for the reflection plate of a backlight unit, there is a limit to solving the thermal problem through heat conduction. Therefore, it is also necessary to have a radiating device using a metal material having high thermal conductivity, or a special structure advantageous for heat dissipation.

Furthermore, for a backlight unit including a reflection plate, a supporting rod, and a lower plate, it is generally effective when the thermal conductivity of a material used as a heat transfer medium is high, as well as the area contacting the external atmosphere is large, in order to effectively emit the heat generated in a heating element such as a light source lamp. However, a reflection plate, a supporting rod, and a lower plate are individually separate products, and so they are typically made of different materials. In the case of the reflection plate and supporting rod, they are mainly manufactured using a polyester or polycarbonate resin composition, and in the case of the lower plate, it is mainly manufactured with a metal material having good thermal conductivity because the role of heat dissipation is important. However, even though the reflection plate, supporting rod, and lower plate manufactured by an existing method are used, it is difficult to effectively solve the heat dissipation problem since the characteristics of each material are different.

Technical Solution

In order to solve the above problem, for a reflection plate made of a thermoplastic thermal conductive resin composition having a thermal conductivity of at least 0.35 W/mK, the inventors of the present invention confirmed that the heat dissipation problem can be solved through thermal conductivity in itself even when a radiating device, special structure, or metal material is not additionally used. Furthermore, it is confirmed that a backlight unit including a reflection plate and a lower plate, which are manufactured with the same thermoplastic thermal conductive resin material, has good thermal conductivity to effectively solve the heat dissipation problem, and the manufacturing process is simplified to reduce the cost, and as a result the present invention can be completed.

Accordingly, the present invention is characterized in that a reflection plate is made of a thermoplastic thermal conductive resin composition having a thermal conductivity of at least 0.35 W/mK.

The present invention is also characterized in that a backlight unit includes a reflection plate and a lower plate, which are made of the same thermoplastic thermal conductive resin material having a thermal conductivity of at least 0.35 W/mK.

The thermoplastic thermal conductive resin composition contains 10-95 wt % of a thermoplastic resin and 90-5 wt % of a ceramic solid.

The thermoplastic resin is not limited, and all kinds of thermoplastic resins can be used. It is preferably used singly or by mixing two or more kinds of polybutylene terephthalate, polyethylene terephthalate, aromatic polyamide, polyamide, polycarbonate, polystyrene, polyphenylenesulfide, thermotropic liquid-crystalline polymer, polysulfone, polyether sulfone, polyetherimide, polyetheretherketone, polyarylate, polymethylmethylacrylate, polyvinylalcohol, polypropylene, polyethylene, polyacrylonitrilebutadienestyrene copolymer, polytetramethyleneoxide-1,4-butanediol copolymer, copolymer containing styrene, fluorine-based resin, polyvinylchloride, polyacrylonitrile, or the like.

Preferably, 10-95 wt % of the thermoplastic resin is contained in a thermoplastic thermal conductive resin composition.

The ceramic solid is used to manufacture a thermoplastic thermal conductive resin composition having a thermal conductivity of at least 0.35 W/mK at room temperature, and it can be used singly or by mixing two or more kinds of boron nitride, silicon carbide, diamond, beryllium oxide, boron phosphide, aluminum nitride, beryllium sulfide, boron arsenide, silicon, gallium nitride, aluminum phosphide, gallium phosphide, or the like, having a thermal conductivity of at least 300 W/mK at room temperature.

Preferably, 5-90 wt % of the ceramic solid is contained in a thermoplastic thermal conductive resin composition.

The thermoplastic thermal conductive resin composition may further contain a filler singly or by mixing two or more kinds such as flake, glass fiber, and a halogen or non-halogen flame retardant. Preferably, 5-15 wt % of the filler may be contained in a thermoplastic thermal conductive resin composition.

For the halogen or non-halogen flame retardant, it may be used singly or by mixing two or more kinds of bromine-based carbonate oligomer, $Sb_2O_3$, and phosphor or red phosphor-based flame retardant, melamine cyanurate, melamine, triphenyl isocyanurate, melamine phosphate, melamine pyrophosphate, ammonium polyphosphate, alkyl amine phosphate, melamine resin, zinc borate, or the like.

The thermoplastic thermal conductive resin composition may further contain a white dielectric material for improving the optical reflection factor.

The white dielectric material may be used singly or by mixing two or more kinds of $BaSO_4$, $TiO_2$, $SiO_2$, $B_2O_3$, $Al_2O_3$, or the like, and 5-40 wt % of the white dielectric material may be preferably contained in a thermoplastic thermal conductive resin composition.

Less than 90 wt % of the ceramic solid and white dielectric material may be preferably contained in a thermoplastic thermal conductive resin.

The thermoplastic thermal conductive resin composition may be manufactured by mixing and extruding the above components in a twin screw extruder. At this time, the barrel temperature of the twin screw extruder should be maintained at 250-340° C.

Advantageous Effects

Preferably, the thermal conductivity of the thermoplastic thermal conductive resin composition is at least 0.35 W/mK. When the thermal conductivity is at least 0.35 W/mK, the thermal conduction rate through a reflection plate is not reduced, thereby effectively solving the thermal problem of a backlight unit, and also it has excellent properties such as workability, reflectivity, mechanical strength, and the like, thereby allowing a structure incorporating a reflection plate together with a lower plate to be manufactured.

BEST MODE

Hereinafter, the preferred embodiments of the present invention will be described in detail with reference to the accompanying drawings. Although preferred embodiments are disclosed herein to facilitate an understanding of the present invention, the following embodiments are only illustrative of the present invention, and it will be appreciated by those skilled in the art that various modifications and changes can be made without departing from the principles and spirit of the present invention, the scope of which is defined in the appended claims, and their equivalents.

EMBODIMENTS

Embodiment 1

A specimen 10 mm in diameter and 0.3 mm in thickness, which is made of a thermoplastic thermal conductive resin composition comprising 60 wt % of polyethyleneterephthalate resin (manufactured by LG Chemical Ltd.) and 40 wt % of boron nitride, was prepared.

Embodiment 2

A specimen 10 mm in diameter and 0.3 mm in thickness, which is made of a thermoplastic thermal conductive resin composition comprising 60 wt % of polyethyleneterephthalate resin (manufactured by LG Chemical Ltd.), 25 wt % of boron nitride, and 15 wt % of $TiO_2$, was prepared.

Embodiment 3

A specimen 10 mm in diameter and 0.3 mm in thickness, which is made of a thermoplastic thermal conductive resin composition comprising 60 wt % of polycarbonate resin (manufactured by LG Chemical Ltd.), 20 wt % of boron nitride, and 20 wt % of $TiO_2$, was prepared.

Embodiment 4

A specimen 10 mm in diameter and 0.3 mm in thickness, which is made of a thermoplastic thermal conductive resin composition comprising 70 wt % of polycarbonate resin (manufactured by LG Chemical Ltd.), 5 wt % of boron nitride, and 25 wt % of $TiO_2$, was prepared.

Comparative Example 1

A specimen 10 mm in diameter and 0.3 mm in thickness, which is made of a resin composition comprising 90 wt % of polycarbonate resin (manufactured by LG-DOW) and 10 wt % of $TiO_2$, was prepared.

Test Example

The properties of the thermoplastic thermal conductive resin compositions and specimens prepared in the above embodiments and comparative example, were measured according to the following methods, and the results are shown in Table 1.

Heat deflection temperature: Measured based on ASTM D648.
Flextural modulus: Measured based on the ASTM D790.
Tensile elongation ratio: Measured based on the ASTM D638.
Thermal conductivity: Shown in terms of the data with less than 10% error based on three kinds of measurement methods, such as a plate method (Tech Center, LG Chemical Ltd.), a heat wire method (Korea Research Institute of Standards and Science), and Hakke Thermoflixer.
Reflectivity: Total reflectance was measured at the wave length of 550 nm with a spectrophotometer (Shimadzu UV-3101 PC).

TABLE 1

| Item | Embodiment 1 | Embodiment 2 | Embodiment 3 | Embodiment 4 | Comparative example 1 |
|---|---|---|---|---|---|
| Heat deflection temperature (° C.) | 90 | 130 | 130 | 120 | 120 |
| Flextural modulus (kg/cm$^2$) | 50000 | 45000 | 50000 | 30000 | 26000 |
| Tensile elongation ratio (%) | 5 | 4 | 4 | 70 | 130 |
| Thermal conductivity (W/mK) | 0.38 | 0.4 | 0.42 | 0.37 | 0.23 |
| Reflectivity (550 nm)(%) | 93 | 92 | 95 | 98 | 85 |

As illustrated in Table 1, it was confirmed that the specimens in Embodiments 1 through 3, which were prepared using a thermoplastic thermal conductive resin composition according to the present invention, are superior in mechanical strength such as heat deflection temperature, flextural modulus, and tensile elongation ratio, superior in reflectivity, and have a thermal conductivity of at least 0.35 W/mK, as compared with the specimen in the comparative example.

INDUSTRIAL APPLICABILITY

According to the present invention, a reflection plate for a backlight unit in a liquid crystal display device has been produced that effectively solves the thermal problem of the backlight unit, and has excellent properties such as shock resistance, heat resistance, mechanical strength, as well as having excellent reflectivity, thereby improving the durability of the liquid crystal display device.

Furthermore, provided is a backlight unit of a liquid crystal display device, in which a reflection plate and lower plate are made of the same material, thereby effectively solving the thermal problem of the backlight unit, and simplifying the manufacturing process.

The invention claimed is:

1. A backlight unit of a liquid crystal display device, characterized in that it includes
    a reflection plate positioned at a lower portion of a lamp of the backlight unit for reflecting a light coming out of the lamp,
    a supporting rod for the lamp, and
    a lower plate functioning as a heat sink,
    wherein the reflection plate and the lower plate for heat sink are made of the same thermoplastic thermal conductive resin composition having a thermal conductivity of at least 0.35 W/mK at room temperature,
    wherein the thermoplastic thermal conductive resin composition consists of 60 to 70 wt % of a thermoplastic resin, 5 to 25 wt % of boron nitride, and 15 to 25 wt % of $TiO_2$,
    wherein the reflection plate has a total reflectivity of light measured with a wavelength of 550 nm of at least 92% and
    wherein the reflection plate has a heat deflection temperature in the range of 120 to 130° C. measured by ASTM D648.

2. The backlight unit of a liquid crystal display device according to claim 1, characterized in that it is the thermoplastic thermal conductive resin composition having a thermal conductivity of 0.35 to 0.42 W/mK.

3. The backlight unit of a liquid crystal display device according to claim 1, characterized in that the thermoplastic resin is one or more kinds selected from a group comprising polybutylene terephthalate, polyethylene terephthalate, aromatic polyamide, polyamide, polycarbonate, polystyrene, polyphenylenesulfide, thermotropic liquid-crystalline polymer, polysulfone, polyether sulfone, polyetherimide, polyetheretherketone, polyarylate, polymethylmethylacrylate, polyvinylalcohol, polypropylene, polyethylene, polyacrylonitrilebutadienestyrene copolymer, polytetramethyleneoxide-1,4-butanediol copolymer, copolymer containing styrene, fluorine-based resin, polyvinylchloride, and polyacrylonitrile.

* * * * *